(12) United States Patent
Shiramizu

(10) Patent No.: US 8,349,520 B2
(45) Date of Patent: Jan. 8, 2013

(54) FUEL CELL AND CATALYST LAYER THEREOF, AND MEMBRANE ELECTRODE ASSEMBLY USING THE SAME

(75) Inventor: Kohei Shiramizu, Tokyo (JP)

(73) Assignee: Toppan Printing Co., Ltd. (JP)

( * ) Notice: Subject to any disclaimer, the term of this patent is extended or adjusted under 35 U.S.C. 154(b) by 1155 days.

(21) Appl. No.: 12/185,028

(22) Filed: Aug. 1, 2008

(65) Prior Publication Data

US 2010/0028756 A1     Feb. 4, 2010

(51) Int. Cl.
*H01M 4/92*     (2006.01)
(52) U.S. Cl. .................................. 429/524; 502/101
(58) Field of Classification Search .............. 429/40
See application file for complete search history.

(56) References Cited

U.S. PATENT DOCUMENTS

| 6,190,428 | B1 * | 2/2001 | Rolison et al. | 44/624 |
| 2002/0061431 | A1 * | 5/2002 | Koyama et al. | 429/33 |
| 2004/0109816 | A1 * | 6/2004 | Srinivas et al. | 423/449.2 |
| 2008/0227996 | A1 * | 9/2008 | Hara et al. | 558/44 |

FOREIGN PATENT DOCUMENTS

| JP | 2006-257234 | 9/2006 |
| WO | WO2005-029508 | 3/2005 |
| WO | WO 2005029508 A1 * | 3/2005 |

OTHER PUBLICATIONS

READE, Amorphous carbon product details, pp. 1-3.*

* cited by examiner

*Primary Examiner* — Ula C Ruddock
*Assistant Examiner* — Daniel Gatewood
(74) *Attorney, Agent, or Firm* — Squire Sanders (US) LLP

(57) ABSTRACT

This invention discloses a catalyst layer which is formed at first incorporating sulfonated amorphous carbons and later the sulfonated amorphous carbons are removed. In addition, said sulfonated amorphous carbons show $^{13}$C NMR spectrum which has chemical shifts indicating carbons of a condensed aromatic 6-membered ring to which sulfonic groups are attached and are not attached respectively, and a powder X-ray diffraction spectrum which has a peak corresponding to the carbon's (002) plane at 5-30 degrees of half-value width ($2\theta$).

8 Claims, 3 Drawing Sheets

FUEL CELL AND CATALYST LAYER THEREOF, AND MEMBRANE ELECTRODE ASSEMBLY USING THE SAME

BACKGROUND OF THE INVENTION

1. Field of the Invention

The present invention relates to a catalyst layer for a fuel cell/battery. This invention also relates to a membrane electrode assembly and a fuel cell, both of which utilize the catalyst layer.

2. Description of the Related Art

In recent years, fuel cells with high energy efficiencies and causing few environmental burdens are attracting attention. Fuel cells electrochemically oxidize fuels such as hydrogen or methanol etc. with an oxidant such oxygen or air and generate electrical energy by transforming the chemical energy of the fuel.

Fuel cells are classified into several types depending on the kind of electrolyte used such as solid polymer type, phosphoric acid type, molten carbonate type, solid oxide type and alkali type. Among them, a solid polymer fuel cell whose electrolyte is a cation-exchange membrane can reduce its internal resistance by using a thinner electrolyte membrane. Therefore, the solid polymer fuel cell can operate a high current to make the fuel cell compact and small. This advantage serves to accelerate the development of solid polymer fuel cells.

The solid polymer fuel cell is generally composed of many stacking unit cells. The unit cell has a sandwich structure in which a membrane electrode assembly is arranged between separators which have flow paths for fuel gases or oxidant gases. The membrane electrode assembly is composed of an anode, a cathode and an electrolyte membrane which is made of a proton conductive polymer and sits between the two electrodes (namely, the anode and the cathode).

One of the key issues for encouraging widespread utilization of solid polymer fuel cells is the reduction of a platinum catalyst which is used in the catalyst layer of the membrane electrode assembly. This is because the world's reserves of platinum are limited. It is said that if all of the present automobiles were shifted from gasoline-powered to fuel-cell-driven, the required platinum would exceed the world's reserves of platinum from the point of view of the required platinum amount per unit area in the present technology. The second reason is cost. It is said that the cost prospect of the membrane electrode assembly is too high to put the fuel cell into practical and widespread use, considering the required platinum amount per unit area in the present technology.

In order to reduce platinum consumption it is essential to use platinum more effectively than ever. The fuel cell reaction takes place at the three-phase boundary in the catalyst layer, where all of the platinum catalyst, the proton conductive material and the fuel gas (or oxidant gas) exist. Thus, it is very important to increase reaction sites by keeping the platinum catalyst and the proton conductive material in an appropriate state in the three-phase boundary. This is achieved, for example, by preparing a catalyst layer by coating and drying ink-like paint which is a mixture of platinum loading carbon and proton conductive polymer electrolyte solution, as is described in JP 2005-320523 A (Laid-Open publication) etc.

FIG. 3 is a partial exemplary diagram showing an example of a conventional catalyst layer. According to the conventional recipe, in which the proton conductive polymer electrolyte (13) and the platinum catalyst loading carbons (14) are combined to form the catalyst layer, the platinum catalyst loading carbons (14) clump together in the electrolyte (13). Then, even if some platinum catalyst loading carbons (11) can provide electrolyte (13) with protons, other platinum catalyst loading carbons (12) can not. Consequently, it becomes difficult to promote efficient use of platinum and this disadvantage results in insufficient battery performance per unit amount of platinum. Particularly when equipped on a vehicle, the fuel gas diffusion and the battery performance tend to be more insufficient because larger instant currents are required than in the case of cogeneration unit use.

The present invention aims to provide a catalyst layer which has a higher output performance but requires less platinum catalyst than before. In addition, this invention provides a fuel cell and a membrane electrode assembly therefor using said catalyst layer.

SUMMARY OF THE INVENTION

FIG. 1 is a partial explanatory diagram showing an example of a catalyst layer of this invention. As a result of keen investigation, the inventor noticed that if added to the catalyst layer, sulfonated amorphous carbons (15) seep into the clump of the platinum catalyst loading carbons because both of these are made from identical elements (carbon) and can easily blend together (FIG. 1(a)). In particular, if the sulfonated amorphous carbons (15) which are used in the catalyst layer are dispersed or dissolved in water, gas flow paths can be made by additional water exposure treatment removing the sulfonated amorphous carbons (15) in the catalyst layer (FIG. 1(b)). Consequently, it becomes possible to effectively utilize the clump of platinum catalyst loading carbons, which are conventionally not utilized under the conventional approach.

Hence, this invention provides the following <1> to <8>.

<1> One embodiment of the present invention is a fuel cell catalyst layer which is at first formed incorporating sulfonated amorphous carbons, the sulfonated amorphous carbons being later removed.

Sulfonated amorphous carbons can seep into the clump of the platinum catalyst loading carbons because both are made from identical elements (carbon) and can easily blend together. After removing these sulfonated amorphous carbons in the catalyst layer, fine pores which help gases to flow smoothly are left. As a result, even platinum catalyst loading carbons which exist deep in the clump are also utilized efficiently and it is possible to reduce platinum usage.

<2> Another embodiment of the present invention is a fuel cell catalyst layer, in which the sulfonated amorphous carbons have a chemical shift corresponding to a carbon of a condensed aromatic 6 membered ring which is and is not attached by sulfonic group in $^{13}$C NMR spectrum, and also have a diffraction peak indicating the carbon's (002) plane whose half-value width (2θ) is 5-30 degrees in the spectrum of powder X-ray diffraction.

Such sulfonated amorphous carbons are stacked with carbons of platinum catalyst loading carbons by Π-Π bonding of their condensed aromatic 6 membered ring and prevent them from clumping. Thus sulfonated amorphous carbons can seep into the catalyst effectively.

<3> Another embodiment of the present invention is a fuel cell catalyst layer wherein the sulfonated amorphous carbons are dispersed in water as particles of 1-500 nm in size.

Such sulfonated amorphous carbons are easily removed by water and serve to increase battery performance. Particles of more than 500 nm can not be removed easily. Particles of less than 1 nm should be regarded as being 'dissolved' rather than 'dispersed'.

<4> Another embodiment of the present invention is a fuel cell catalyst layer wherein the sulfonated amorphous carbons are dissolved in water.

'Dissolved' sulfonated amorphous carbon includes 'dispersed' sulfonated amorphous carbon as particles of less than 1 nm. 'Dissolved' sulfonated amorphous carbons are preferably applicable to this invention.

<5> Another embodiment of the present invention is a fuel cell catalyst layer wherein the catalyst layer includes 0.1-20% by weight of the sulfonated amorphous carbons before their removal.

If the sulfonated amorphous carbon ratio is less than 0.1% by weight out of the entire solid content, the platinum catalyst loading carbons can not be kept from clumping together and do not allow a reduction in platinum catalyst. In contrast, a ratio of more than 20% makes it very difficult to remove the sulfonated amorphous carbon and the catalytic layer becomes too thin.

<6> Another embodiment of the present invention is a fuel cell catalyst layer wherein the amount of platinum per electrode is 0.3 mg/cm$^2$ or less, and the battery output performance is 0.7 W/cm$^2$ or more at a temperature of 80° C. and a current of 1 A.

Such a catalyst layer dramatically reduces platinum consumption which has conventionally been as much as 1 mg/cm$^2$ and lightens the burden on the environment.

<7> Another embodiment of the present invention is a membrane electrode assembly using the catalyst layer of this invention.

This kind of membrane electrode assembly has such a large hydrogen adsorption area that it can use platinum catalyst efficiently and shows a good performance.

<8> Another embodiment of the present invention is a fuel cell using the catalyst layer of this invention.

This kind of fuel cell has such a large hydrogen adsorption area that it can use platinum catalyst efficiently and shows a good performance.

BRIEF DESCRIPTION OF THE DRAWINGS

FIG. 1 (*b*) is an explanatory diagram of the removal of the sulfonated amorphous carbons.

DESCRIPTION OF REFERENCE NUMERALS AND SIGNS

Figure 1:
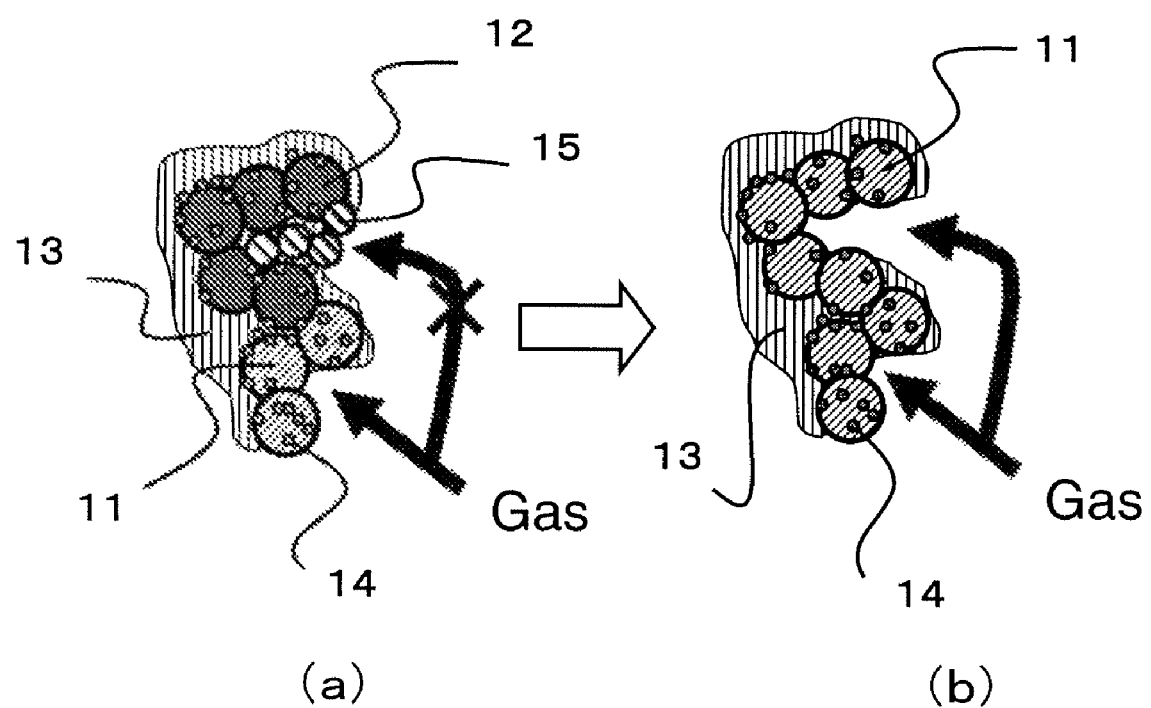
FIG. 1 (*a*) is a partial schematic diagram of one example of a catalyst layer of this invention.

11: Platinum catalyst loading carbons which receive a fuel gas supply
12: Platinum catalyst loading carbons which do not receive a fuel gas supply
13: Proton conductive polymer electrolyte
14: Platinum catalyst
15: Sulfonated amorphous carbons

DETAILED DESCRIPTION OF THE INVENTION

This invention is described in detail below.

While conventional catalyst layers are composed of proton conductive polymer electrolyte and platinum catalyst loading carbons, the catalyst layer of this invention further includes a characteristic process of incorporating and removing sulfonated amorphous carbons.

Any carbons which have sulfonic groups and show amorphous carbon properties can be used as the sulfonated amorphous carbons of this invention. An amorphous carbon hereby means a material made from carbon which has no specific crystalline structure such as diamond or graphite, and more specifically, has only a broad peak or no distinct peak in its powder X-ray diffraction spectrum.

Examples of preferable sulfonated amorphous carbons are:
<1> Sulfonated amorphous carbons which have properties (A) and (B) described below; <2> Sulfonated amorphous carbons which have properties (A), (B) and (C) or (D) described below; <3> Sulfonated amorphous carbons which have properties (A), (B), (C), (D) and (E) described below.

(A) Chemical shifts of carbon of a condensed aromatic 6 membered ring to which sulfonic group are attached and are not attached are detected in the $^{13}$C-NMR (Nuclear Magnetic Resonance) spectrum.

(B) Diffraction peak corresponding to the carbon (002) surface which has a half value width (2θ) of 5 to 30° is detected in the powder X-ray diffraction spectrum.

(C) Sulfonated acid density is 0.5-14 mmol/g.

(D) The atom ratio of sulfonated carbons to all carbons is 3-20%

(E) The content of sulfur is 0.3-15 atm %.

With respect to the property (B), although peaks other than carbon (002) plane may also be detected, it is preferable that the carbon (002) plane is the only detected peak.

With respect to the property (C), it is true that the required sulfonic acid density is in the 0.5-14 mmol/g range, but 2-12 mmol/g is more preferable. If the sulfonated acid density is too low, platinum catalyst loading carbons clump together. In contrast, if the sulfonated acid density is too high, sulfonated amorphous carbons can not be synthesized in reasonable yield.

With respect to the property (D), the atom ratio of sulfonated carbons to all carbons is preferred to be 3-20% because the platinum catalyst loading carbons hardly clump together at this ratio.

With respect to the property (E), although the sulfur content is required to be 0.3-15 atm %, 3-10 atm % is more preferable since the platinum catalyst loading carbons hardly clump together.

Figure 2:
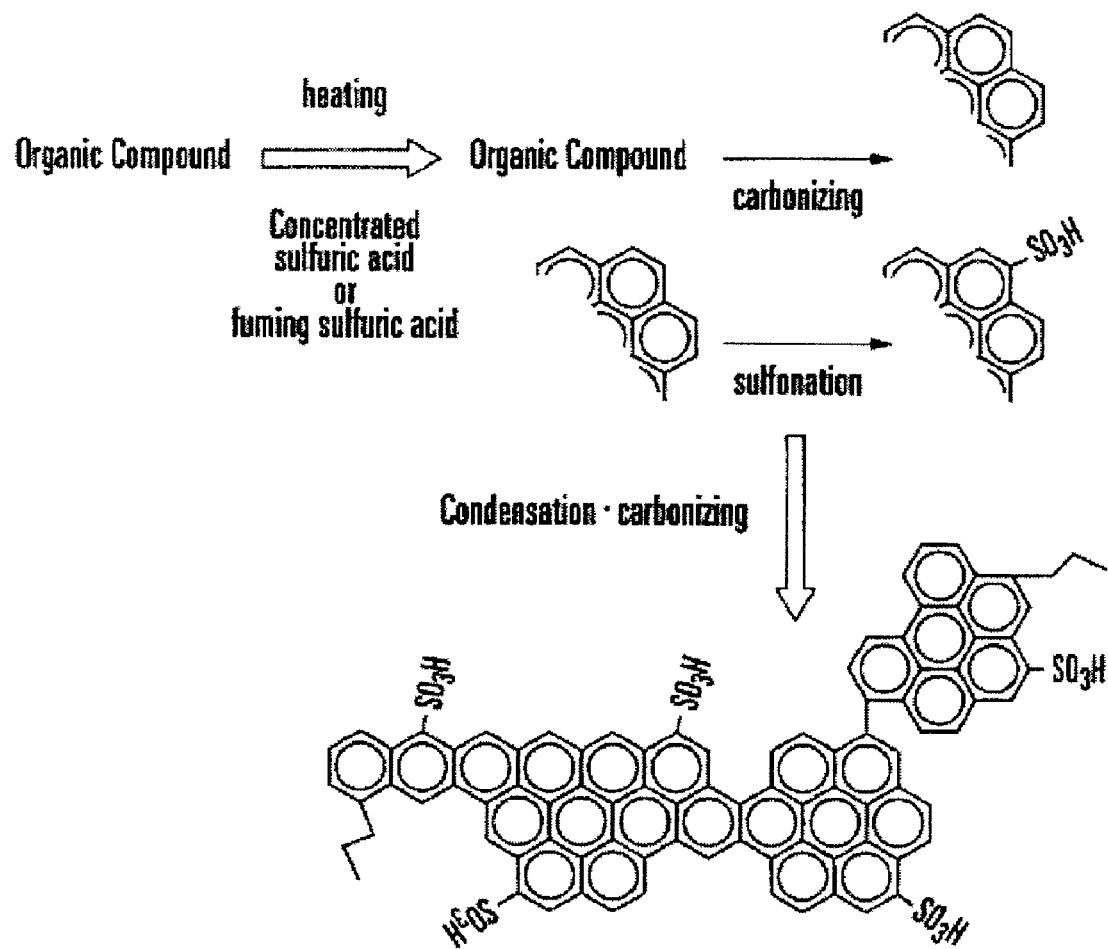
FIG. 2 shows the manufacturing process of sulfonated amorphous carbons from a raw organic compound.
Figure 3:
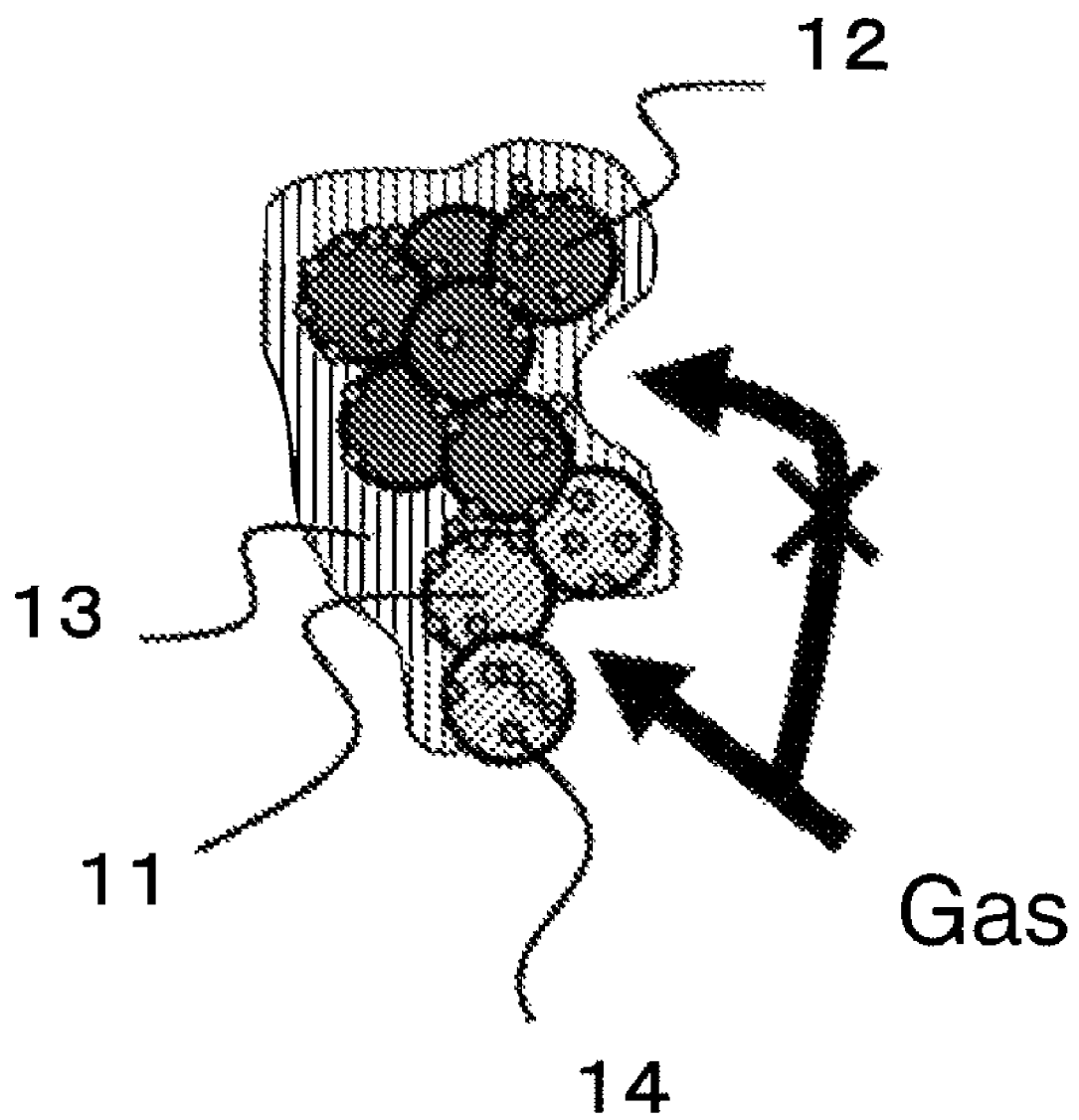
FIG. 3 is a partial schematic diagram of one example of a conventional catalyst layer.

The sulfonated amorphous carbons are produced, for example, by heating organic compounds in concentrated sulfuric acid or fuming sulfuric acid. The outline of this production method is indicated in FIG. 2. Heating treatment of organic compounds in concentrated sulfuric acid or fuming sulfuric acid promotes carbonization, sulfonation and condensation between carbon rings. As a result, the sulfonated amorphous carbons are produced as illustrated in FIG. 2.

It is necessary to perform a heating treatment of organic compounds in concentrated sulfuric acid or fuming sulfuric acid under the flow current of dry air or inactive gas such as nitrogen or argon to produce amorphous carbons with a high sulfonic acid density. A more preferable treatment is blowing dry air or inactive gas such as nitrogen, argon etc. into the concentrated sulfuric acid or fuming sulfuric acid which includes organic compounds while heating. The reaction of aromatic compounds with concentrated sulfuric acid, which produces aromatic sulfonic acid and water, is an equilibrium reaction. Thus, as water increases in the reaction system, the amount of sulfonic acid incorporated into the amorphous carbons decreases dramatically because the reverse reaction is accelerated. Amorphous carbons with high sulfonic acid density can be produced when the reaction is performed under the flow current of inactive gases or dry air, which removes water actively from the reaction system.

Sulfonation reaction as well as condensation, cyclization and partial carbonization of organic compounds takes place in the heating treatment. Therefore, the reaction temperature has no specific limitation but needs to be sufficiently high so that these reactions proceed. It may be around 100-350° C. for industrial production, or more preferably 150-250° C.

The reaction temperature lower than 100° C. causes insufficient condensation and carbonization of organic compounds and may lead to incomplete carbon formation. In the case where the reaction temperature is higher than 350° C., a thermal decomposition of sulfonic groups can be induced.

The heating duration is determined appropriately in accordance with the kind of organic compounds and reaction temperature etc. It is ordinarily likely to be 5-50 hours and is preferred to be 10-20 hours.

Although the concentrated sulfuric acid or the fuming sulfuric acid usage has no limitation, it is ordinarily likely to be 2.6-50.0 mol and is preferred to be 6.0-36.0 mol in proportion to 1 mol of the organic compounds.

Aromatic hydrocarbons can be used as the organic compounds. Other organic compounds for example natural compounds such as glucose, succulose and cellulose, or synthetic polymers such as polyethylene and polyacrylamides can also be used. The aromatic hydrocarbons include both polycyclic aromatic hydrocarbons and monocyclic aromatic hydrocarbons. Therefore benzene, naphthalene, anthracene, perylene and coronene etc. can be used and especially naphthalene is preferable among them. One kind of these organic compounds alone or plural kinds of these organic compounds together can be used in this invention. In addition, it is not necessary to use refined organic compounds. For example, heavy oils which contain hydrocarbons, pitch oils, tar oils or asphalts can be used.

In the case where synthetic polymers or natural compounds such as glucose or cellulose are used as raw materials, it is preferred that they are partially carbonized by heating in an inactive gas flow ahead of the heating treatment in concentrated sulfuric acid and/or fuming sulfuric acid. The heating temperature of these is ordinary 100-350° C. and the heating duration is ordinary 1-20 hours. It is desirable that the diffraction peak signal which corresponds to the carbon's (002) plane and whose half-value width (2θ) is 30 degrees is detected in the powder X-ray diffraction spectrum of the heated raw material after the partial carbonization treatment.

In the case where the raw materials are the aromatic hydrocarbons or heavy oils which contain aromatic hydrocarbons, pitch oils, tar oils or asphalts etc., it is preferred that the product material is heated under a vacuum after the heating treatment in concentrated sulfuric acid or fuming sulfuric acid. This will help to remove any surplus sulfuric acid and also encourage carbonization and solidification of the product material, which increases the yield. With regard to evacuation, it is preferred to use a vacuum pump whose exhaust velocity is 10 L/min. or more and ultimate vacuum is 13.3 kPa or lower. The preferable temperature is 140-300° C., especially 200-280° C. The vacuum duration under this temperature is ordinarily 2-20 hours.

In addition, chemically treated, for example, fluorinated materials made from sulfonated amorphous carbons can also be used preferably in this invention. In particular, fluorination makes the acidity of sulfonic groups strong and serves to keep the platinum catalyst loading carbons from clumping together.

Polymer electrolytes or electrolyte films which conduct protons can be used preferably as the proton conductive polymer electrolyte (including film) in this invention. Among them, proton conductive polymer electrolyte in which sulfonic groups are incorporated especially shows superior proton conductivity. Sulfonated compounds which are made from resins exemplified below can be used as these polymer electrolytes. Either one of the products or a mixture of any combination of the products can be used. Derivatives or copolymers of these resins can also be used. These resins are, for example, epoxy resin, urea resin, silicone resin, propylene resin, phenol resin, xylene resin, melamine resin, polyester resin, alkyd resin, vinylidene resin, furan resin, urethane resin, polyphenylene ether resin, polycarbonate resin, acrylate resin, amide resin, imide resin, vinyl resin, carboxylic resin, fluorine resin, nylon resin, styrene resin and other engineering plastics. But this is not all. In addition to this, not only the organic polymers cited above but also organic-inorganic hybrid polymers, silicate resins, liquid glasses and various kinds of inorganic polymers can also be used. Among them, sulfonated fluorine resins particularly show good performance. As such sulfonated fluorine resins, fluorine polymeric proton conductive electrolytes which are named "Nafion" (a registered trademark) by Dupont (E. I. du Pont de Nemours and Company), "Flemion" (a registered trademark) by ASAHI GLASS Co., LTD. or etc. are commercially supplied. Furthermore, sulfonated partial-fluorine resins, which are partially fluorine-substituted, also show good performances. When made into a film, the proton conductive electrolyte described above can be used as a proton conductive electrolyte membrane.

The above stated engineering plastics have no limitation as long as they have thermostability of 100 degrees Celsius or more, strength of 49.0 MPa or more and flexural modulus of 2.4 GPa or more. This includes polyamide, polybuthylene terephthalate, polycarbonate, polyacetal, modified polyphenylene oxide, modified polyphenylene ether, polyphenylene sulfide, polyether ether ketone, polyether sulfone, polysulphone, polyamide imide, polyether imide, polyimide, polyarylate, polyaryl ether nitrile etc. Among them, modified polyphenylene oxide, modified polyphenylene ether, polyphenylene sulfide, polyether ether ketone, polyether sulfone, polysulphone, polyamide imide, polyether imide, polyimide, polyarylate, polyaryl ether nitrile are especially preferred because of their high level of stability. Sulfonated products of these materials also show good output properties.

A catalyst made from platinum or platinum-alloy is preferred for use in the platinum catalyst loading carbons incorporated in the catalyst layer of this invention. In some specific cases, use of a platinum-alloy may serve to increase stability and/or activity of the platinum catalyst loading carbons as an electrode catalyst.

It is preferred that this platinum-alloy be made from platinum and metal(s) which is/are selected from the following: platinum-group metal other than platinum (i.e. ruthenium, rhodium, palladium, osmium, iridium), gold, silver, chromium, iron, titanium, manganese, cobalt, nickel, molybdenum, tungsten, aluminum, silicon, zinc, and tin. This platinum-alloy may include an intermetallic compound of platinum. Especially a platinum-alloy of ruthenium or cobalt is preferable when the supply gas to the anode contains carbon monoxide since the catalyst activity becomes stable.

In addition, catalysts other than platinum such as tungsten carbide can also be used in this invention.

An example of a manufacturing method of the membrane electrode assembly of this invention is illustrated below.

First, sulfonated amorphous carbons which disperse or dissolve in water, proton conductive polymer electrolyte and platinum catalyst loading carbons are mixed in a solvent to prepare a catalyst varnish.

Next, this varnish is coated on conductive porous bodies such as carbon fibers and dried to make an electrode which incorporates a catalyst layer. Then this electrode is bonded by thermal compression to a sheet of electrolyte film such as Nafion or sulfonated engineering plastic by means of a press machine etc., to create a membrane electrode assembly. At this time, an adhesive agent obtained by dissolving a proton conductive polymer electrolyte in a thinner may be used in order to improve thermal compression bonding. Assembling with separators and other supplementary equipment (gas supply units, cooling apparatus etc.), a single sheet or stacked sheets of membrane electrode assembly is/are made into a fuel cell. Furthermore, the sulfonated amorphous carbons are removed with water produced by electric power generation by the fuel cell. Since the water produced by electric power generation is only an example, the sulfonated amorphous carbons which disperse or dissolve in water can be removed with sprayed water vapor or directly supplied washing water.

In addition, since the thermal compression bonding described above is only an example, it is possible to coat the catalytic varnish on a conductive porous body such as carbon fibers etc. by a spraying method.

Moreover, sometimes the sulfonated amorphous carbons are easily removed by adding a water repellent material to the catalyst varnish. Fluorine series resins such as polytetrafluoroethylene (PTFE), fluoroethylene propylene (FEP), and polyfluorovinylidene (PVDF) etc. and silicone resins are examples of the water repellent material.

Carbon fibers such as carbon paper, carbon cloth and carbon felt and porous materials of other conductive materials such as metal are examples of the conductive porous body of this invention and they can all be used either with a fuel gas diffusion layer or with an air diffusion layer. Considering corrosion resistance etc., carbon fibers are more preferable than metals in many cases. Moreover, carbon fibers which have a filler layer made from carbon black and fluorine series binder may be used in order to make and keep good contact with the catalyst layer. As such materials, LT-1200 made by E-TEC Corporation, for example, is commercially available and can be applied to this invention preferably.

This invention provides a catalyst layer which effectively sends and utilizes fuel gas and oxidant gas. And this invention provides a membrane electrode assembly and a fuel cell using this catalyst layer. The hydrogen adsorption area, which expands as the platinum catalysts are used efficiently, became larger. Hence even in the case of less platinum, the output property of the membrane electrode assembly of this invention remarkably exceeds that of a conventional method. Moreover, since an addition of the sulfonated amorphous carbons prevents the catalytic varnish from clumping together, solvent content in the catalytic varnish can be reduced, which serves to decrease the burden on the environment.

The fuel cell catalyst layer is composed of a proton conductive polymer electrolyte and platinum catalyst loading carbons. These platinum catalyst loading carbons are clumping together or dispersed and the fuel cell catalyst layer has pores.

EXAMPLES

This invention is clarified with specific examples hereafter but the specific examples do not limit this invention.

Example

[Preparation of Varnish]

Sulfonated amorphous carbons which were dispersed or dissolved in water, proton conductive polymer electrolyte and platinum catalyst loading carbons were combined in a solvent to make mixtures which had the weight percent ratio as illustrated in Table 1 in order to prepare catalytic varnishes. The amount ratio of Nafion and platinum catalyst loading carbons was adjusted to be around 1:2. The total matter shown in Table 1 corresponded to sulfonated amorphous carbons, proton conductive polymer electrolyte and platinum catalyst loading carbons. This total matter was mixed and kneaded in a ball mill. Varnishes which had 10% or 15% of the total matter were prepared. Their viscosity was measured by VISCOMATE VM-1A-MH made by Yamaichi Electronics Co., Ltd.

TABLE 1

|  | a | b | c | d |
|---|---|---|---|---|
| Compound | 4 | 4 |  |  |
| Benzenesulfonic acid |  |  |  | 4 |
| Nafion | 32 | 32 | 34 | 32 |
| Platinum catalyst loading Carbons | 64 | 64 | 66 | 64 |
| Total matter [%] | 10 | 15 | 10 | 10 |
| Viscosity [mPa * S] | 60 | 400 | 400 | 370 |

Sulfonated amorphous carbons: Compound described below

Proton conductive polymer electrolyte: Nafion

Total matter %=(weight of compound or benzenesulfonic acid+weight of proton conductive polymer electrolyte+weight of Platinum catalyst loading carbons)/(weight of compound or benzenesulfonic acid+weight of proton conductive polymer electrolyte+weight of Platinum catalyst loading carbons+weight of solvent)×100

[Compound]

Naphthalene was added to concentrated sulfuric acid (96%) and heated at 250° C. for 15 hours. After residual sulfuric acid was removed by distillation at 250° C. under reduced pressure, black powder was obtained. This black powder was washed with 300 ml of fresh distilled water repeatedly until the amount of sulfuric acid in the wash water fell below a measurable limit of an elemental analysis. Then sulfonated amorphous carbons were obtained and the density of sulfonic acids was 4.5 mmol/g. After being sifted, the resulting carbon compounds which dispersed well in water and the degree of dispersion were 15 nm were extracted. The degree of dispersion was obtained from the number average size measured by a particle size analyzer Nanotrac UPA-EX made by NIKKISO CO., LTD.

[Formation of a Catalyst Layer and Production of a Membrane Electrode Assembly]

Each catalytic varnish a-c described above was coated on carbon fibers so that the platinum catalyst quantity became 0.3 mg/cm² respectively and was dried to make electrodes which incorporated catalyst layers. These electrodes were bonded to electrolyte films of Nafion 112 by thermal compression using a pressing machine. Consequently, membrane electrode assemblies, on which anode and cathode electrodes were formed, were obtained.

TABLE 2

|  | Example 1 (E1) | Example 2 (E2) | Comparative example 1 (C1) |
|---|---|---|---|
| Varnish | a | b | c |

TABLE 2-continued

|  | Example 1 (E1) | Example 2 (E2) | Comparative example 1 (C1) |
|---|---|---|---|
| Electrolyte film | Nafion 112 | Nafion 112 | Nafion 112 |
| Platinum catalyst quantity mg/cm$^2$ | 0.3 | 0.3 | 0.3 |

[Evaluation]

Output Characteristics 1 (Before the Removal of Sulfonated Amorphous Carbons):

A separator was attached to each membrane electrode assembly. Then the current-voltage characteristics of each membrane electrode assembly were measured by fuel cell test equipment (GFT-SG1 made by TOYO Corporation) under the condition of 80° C. and RH 100%. The output mW/cm$^2$ when the current density was 1 A/cm$^2$ was obtained, flowing oxygen to one electrode and hydrogen to the other to generate electric power.

Output Characteristics 2 (after the Removal of Sulfonated Amorphous Carbons):

Each membrane electrode assembly which was used in the previous measurement and to which separators were attached, was operated at a constant voltage of 0.2 V by fuel cell test equipment (GFT-SG1 made by TOYO Corporation) under the condition of 80° C. and RH 100%. Consequently, much water was produced in the catalyst layer and sulfonated amorphous carbons whose degree of dispersion in water was 15 nm was removed with the water. At this time, as the removal of sulfonated amorphous carbons preceded, applicable electric current gradually increased. When this increase of current stopped and became a constant current, the current-voltage characteristics was measured. The output mW/cm$^2$ when the current density was 1 A/cm$^2$ was obtained, flowing oxygen to one electrode and hydrogen to the other to generate electric power. The similar operations and measurements were also made with respect to the comparative example 1.

Hydrogen Adsorption Area:

After the removal of sulfonated amorphous carbons, a separator was attached to each membrane electrode assembly of the examples 1-2 and the comparative example 1. Then, its cyclic voltammetry was measured with fuel cell test equipment (GFT-SG1 made by TOYO Corporation) under the condition of 40° C. and RH 100%. The adsorption area was obtained from the cyclic voltammetry waveform of hydrogen desorption. The larger the adsorption area was, the more efficiently and the better platinum was used.

TABLE 3

|  | Example (E) number | |
|---|---|---|
|  | E1 | E2 |
| Output characteristics 1 mW/cm$^2$ | 200 | 210 |
| Output characteristics 2 mW/cm$^2$ | 700 | 710 |
| Hydrogen adsorption area cm$^2$/mg | 280 | 290 |

|  | Comparative example (C) number |
|---|---|
|  | C1 |
| Output characteristics 1 mW/cm$^2$ | 400 |
| Output characteristics 2 mW/cm$^2$ | 530 |
| Hydrogen adsorption area cm$^2$/mg | 220 |

A catalyst layer containing 4% of sulfonated amorphous carbons whose degree of dispersion was 15 nm had low output characteristics 1 of 200 mW/cm$^2$ before the removal of sulfonated amorphous carbons. After operating the fuel cell to generate much water in the catalyst layer and removal of the water along with sulfonated amorphous carbons dispersed in it, however, the hydrogen adsorption area was as large as 280 cm$^2$/mg and output characteristics 2 also became as high as 700 mW/cm$^2$ (example 1). On the other hand, a catalyst layer containing no sulfonated amorphous carbons whose degree of dispersion was 15 nm had a small hydrogen adsorption area of 220 cm$^2$/mg and output characteristics 2 was as low as 530 mW/cm$^2$ (comparative example 1).

Moreover, an addition of 4% of sulfonated amorphous carbons whose degree of dispersion was 15 nm turned out to remarkably reduce the viscosity of varnish 'a' from 400 mPaS (no sulfonated amorphous carbons) to 60 mPaS to keep the platinum catalyst loading carbons from clumping together. Furthermore, the viscosity reduction capability of benzenesulfonic acid turned out to be very weak at 370 mPaS so that the aggregation of the platinum catalyst loading carbons was not prevented sufficiently. (Table 1)

These facts mentioned above imply that platinum catalyst loading carbons and sulfonated amorphous carbons fit in each other to reduce platinum catalyst loading carbons not in use and consequently platinum catalyst loading carbons were allowed to receive more hydrogen, which meant the hydrogen adsorption area was broadened. Also, since sulfonated amorphous carbons had a larger aromatic rings area and made stronger Π-Π stack bonding to carbons than benzenesulfonic acid, it appears that their viscosity reduction brought about a more dramatic effect than that of benzenesulfonic acid. In addition, sulfonated amorphous carbons showed a remarkably higher viscosity reduction effect than benzene sulfonic acid. This seemed to be because sulfonated amorphous carbons had a larger aromatic rings area and made stronger Π-Π stack bonding to the carbons of platinum catalyst loading carbons than benzene sulfonic acid. The Π-Π stack bonding is a specific intermolecular force in aromatics.

In addition, example 2, in which solvent-reduced varnish 'b' was applied in order to adjust the viscosity to 400 mPaS, showed a large hydrogen adsorption area of 290 cm$^2$/mg and high level of output characteristics 2 of 710 mW/cm$^2$. In this way, this invention makes it possible to cut the solvent usage which serves to reduce burdens on the environment. This reduction increases to 5%, which might appear minor but in fact achieves a major effect when in the process of mass production.

As described above, the method of forming catalyst layers with sulfonated amorphous carbons which disperse or dissolve in water and finally removing them is proved to create a large hydrogen adsorption area and high level of output characteristics.

Sulfonated amorphous carbons are synthesized by extremely simple and easy reactions such as sulfonation and carbonization. And they have high density such as 4.5 mmol/g of sulfonate acid and show high proton conductivity. Moreover, it might be unnecessary to synthesize them in the first place because it is wasted as large scale industrial waste, as sulfate pitch. Thus this invention serves to remarkably reduce a burden on the environment by recycling industrial waste.

What is claimed is:

1. A method for making a fuel cell catalyst layer, comprising: forming a fuel cell catalyst layer including sulfonated amorphous carbons, a proton conductive polymer electrolyte and platinum catalyst loading carbons; and then creating fine pores in said fuel cell catalyst layer by removing said sulfonated amorphous carbons from said fuel cell catalyst layer, wherein a chemical shift of said sulfonated amorphous carbons indicating carbons of a condensed aromatic 6-membered ring to which sulfonic groups are attached and are not attached respectively is detected in a spectrum of the 13C-NMR, and wherein a diffraction peak signal corresponding to the carbon's (002) plane whose half-value width (2θ) is 5-30 degree is detected in a spectrum of powder x-ray diffraction of said sulfonated amorphous carbons.

2. The method according to claim 1, further comprising: dispersing said sulfonated amorphous carbons in water as particles of 1-500 nm in size before forming of the fuel cell catalyst.

3. The method according to claim 1, further comprising: dissolving said sulfonated amorphous carbons in water before forming of the fuel cell catalyst.

4. The method according to claim 1, wherein said catalyst layer includes 0.1-20% by weight of said sulfonated amorphous carbons before removal of said sulfonated amorphous carbons.

5. A battery fuel cell comprising: a plurality of electrodes, wherein each electrode includes a fuel cell catalyst layer made according to claim 1, and wherein an amount of platinum per electrode is 0.3 mg/cm$^2$ or less, and an output of 0.7 W/cm$^2$ or more at a temperature of 80° C. and a current of 1 A.

6. A method for making a fuel cell, comprising making a fuel cell catalyst layer according to claim 1.

7. A method for making a membrane electrode assembly, comprising making a fuel cell catalyst layer according to claim 1.

8. A method of manufacturing a membrane electrode assembly, comprising:
preparing a varnish by mixing sulfonated amorphous carbons, proton conductive polymer electrolyte and platinum catalyst loading carbons with a solvent;
producing an electrode which has a catalyst layer by coating said varnish on conductive porous bodies and drying;
producing said membrane electrode assembly by thermally compressing said electrode to an electrolyte film; and
creating fine pores in said membrane electrode assembly by removing some of or all of said sulfonated amorphous carbons with water from said membrane electrode assembly, wherein a chemical shift of said sulfonated amorphous carbons indicating carbons of a condensed aromatic 6-membered ring to which sulfonic groups are attached and are not attached respectively is detected in a spectrum of the $^{13}$C-NMR, and wherein
a diffraction peak signal corresponding to the carbon's (002) plane whose half-value width (2θ) is 5-30 degree is detected in a spectrum of powder x-ray diffraction of said sulfonated amorphous carbons.

* * * * *